(12) United States Patent
Sanz De Acedo Pollan et al.

(10) Patent No.: US 11,479,085 B2
(45) Date of Patent: Oct. 25, 2022

(54) TEMPERATURE CONTROLLED GOODS VEHICLES

(71) Applicant: THERMO KING CORPORATION, Minneapolis, MN (US)

(72) Inventors: Oscar Sanz De Acedo Pollan, Pamplona (ES); Tom McNamara, Tullamore (IE)

(73) Assignee: Thermo King Corporation, Minneapolis, MN (US)

( * ) Notice: Subject to any disclaimer, the term of this patent is extended or adjusted under 35 U.S.C. 154(b) by 239 days.

(21) Appl. No.: 16/877,777

(22) Filed: May 19, 2020

(65) Prior Publication Data
US 2020/0369123 A1    Nov. 26, 2020

(30) Foreign Application Priority Data

May 24, 2019 (EP) ..................................... 19382419

(51) Int. Cl.
*B60H 1/32* (2006.01)
*H02J 7/00* (2006.01)
*H02J 7/35* (2006.01)

(52) U.S. Cl.
CPC ......... *B60H 1/3211* (2013.01); *B60H 1/3226* (2013.01); *H02J 7/0047* (2013.01); *H02J 7/35* (2013.01)

(58) Field of Classification Search
CPC ... B60H 1/3211; B60H 1/2226; H02J 7/0047; H02J 7/35; F25B 27/002; F25B 27/005
See application file for complete search history.

(56) References Cited

U.S. PATENT DOCUMENTS 10,315,495 B2 *   6/2019   Vehr ....................... F25B 49/02
10,389,298 B2 *   8/2019   Paek ....................... H02S 40/38
(Continued)

FOREIGN PATENT DOCUMENTS

GB         2471331         12/2010

OTHER PUBLICATIONS

Extended European Search Report, issued in the corresponding EP patent application No. 19382419.0, dated Dec. 10, 2019, 6 pages.

*Primary Examiner* — Marc E Norman
(74) *Attorney, Agent, or Firm* — Hamre, Schumann, Mueller & Larson, P.C.

(57) ABSTRACT

The present disclosure relates to a method for operating a temperature control system for a temperature controlled goods vehicle, wherein the temperature control system comprises: a solar panel and a temperature control unit comprising: one or more temperature control components; a battery coupled to the solar cell (200) for receiving a first charging current $i_1$ from the solar cell; an engine operative to supply a second charging current $i_2$ to the battery; and a controller. The method comprises: at the controller: monitoring a voltage of the battery; if the voltage of the battery exceeds a first battery voltage threshold for a first predetermined amount of time: determining a first energy count value representing an amount of energy delivered by the solar panel in a predetermined time period; if the first energy count value exceeds a first energy count value threshold: determining an average current value representing an average amount of energy delivered by the solar panel in the predetermined time period; and increasing a cycle threshold value that determines when the engine is deactivated so as to stop supplying the second charging current $i_2$ to the battery based on the average current value.

17 Claims, 4 Drawing Sheets

(56) References Cited

U.S. PATENT DOCUMENTS

| | | | |
|---|---|---|---|
| 2013/0000342 A1* | 1/2013 | Blasko | B60H 1/3223 62/235.1 |
| 2015/0188360 A1 | 7/2015 | Doane et al. | |
| 2015/0246593 A1 | 9/2015 | Larson et al. | |
| 2016/0297384 A1* | 10/2016 | Guo | F25B 27/005 |
| 2017/0063104 A1 | 3/2017 | Bean | |
| 2018/0152044 A1 | 5/2018 | Srnec et al. | |

* cited by examiner

TEMPERATURE CONTROLLED GOODS VEHICLES

FIELD OF THE INVENTION

The present disclosure relates to the field of temperature controlled goods vehicles.

BACKGROUND

Many different types of goods including, for example, foodstuffs and medicines, need to be maintained at a predetermined temperature or within a predetermined temperature range during transport in order to ensure that they arrive at their destination in a safe condition or in a condition of acceptable freshness.

To meet this need, temperature controlled goods vehicles have been developed for transporting such goods. One common form of temperature controlled goods vehicle is a temperature controlled trailer configured to be towed by a tractor unit for transportation of goods by road, though other forms of temperature controlled goods vehicle such as trucks, vans and the like are available.

Such temperature controlled goods vehicles typically include a temperature control unit that is operative to maintain the temperature within a goods space of the vehicle at a predetermined temperature or within a predetermined temperature range. The temperature control unit may be, for example, a refrigeration unit or a heating unit, or a combined refrigeration and heating unit.

A temperature control unit of this kind typically includes an engine, e.g. a diesel engine, temperature control components such as a pump, heat exchanger and associated pipework, and electrical components such as temperature sensors, a controller, and a display unit. The engine is operative to drive the pump and other temperature control components whilst a battery is provided to power the electrical components. The temperature control unit typically also includes an alternator which is driven by the engine to provide a charging current to recharge the battery.

The temperature control unit may be operable in a first mode of operation in which the engine and temperature control components operate continuously, to maintain the temperature in the goods space of the vehicle at a predetermined temperature or within a predetermined relatively narrow temperature range. The temperature control unit may also be operable in a second mode of operation in which the engine and temperature control components operate intermittently under the control of the controller, to maintain the temperature in the goods space of the vehicle within a predetermined temperature range that is typically broader than the relatively narrow temperature range of the first mode of operation. As will be appreciated, in the first mode of operation the amount of fuel (e.g. diesel) consumed by the temperature control unit will be greater than the amount of fuel consumed by the temperature control unit in the second mode of operation, since the engine operates continuously in the first mode but only intermittently in the second mode.

In the second mode of operation electrical components such as the temperature sensors, controller and display unit continue to operate. The operation of these components drains the battery. To mitigate this, the temperature control unit may be operative to start the engine periodically to recharge the battery even when operation of the engine is not required to achieve a desired temperature within the goods space of the vehicle. As will be appreciated, running the engine solely to charge the battery increases the fuel consumption of the temperature control unit. The ever increasing cost of fuel and continued drive to reduce exhaust gas emissions gives rise to a desire to reduce the fuel consumption of such temperature control units.

SUMMARY

According to a first aspect, the invention provides a method for operating a temperature control system for a temperature controlled goods vehicle, wherein the temperature control system comprises: a solar panel and a temperature control unit comprising: one or more temperature control components; a battery coupled to the solar cell for receiving a first charging current $i_1$ from the solar cell; an engine operative to supply a second charging current $i_2$ to the battery; and a controller, the method comprising: at the controller: monitoring a voltage of the battery; if the voltage of the battery exceeds a first battery voltage threshold for a first predetermined amount of time: determining a first energy count value representing an amount of energy delivered by the solar panel in a predetermined time period; if the first energy count value exceeds a first energy count value threshold: determining an average current value representing an average amount of energy delivered by the solar panel in the predetermined time period; and increasing a cycle threshold value that determines when the engine is deactivated so as to stop supplying the second charging current $i_2$ to the battery based on the average current value.

Increasing the cycle threshold value may comprise: if the average current value is greater than a first average current threshold value but less than a second average current threshold value and the cycle threshold value is less than a first cycle threshold value, increasing the cycle threshold value to the first cycle threshold value.

The first average current threshold value may be, for example, 1 amp, the second average current threshold value may be, for example 1.5 amps, and the first cycle threshold value may be, for example, 5 amps.

Increasing the cycle threshold value may comprise: if the average current value is greater than a third average current threshold value but less than a fourth average current threshold value, increasing the cycle threshold value to a second cycle threshold value; if the average current value is greater than a fifth average current threshold value but less than a sixth average current threshold value, increasing the cycle threshold value to a third cycle threshold value; if the average current value is greater than a seventh average current threshold value but less than an eighth average current threshold value, increasing the cycle threshold value to a fourth cycle threshold value; and if the average current value is greater than a ninth average current threshold value, increasing the cycle threshold value to a fifth cycle threshold value.

The third average current threshold value may be, for example, 1.5 amps, the fourth average current threshold value may be, for example, 2 amps, the second cycle threshold value may be, for example, 6 amps, the fifth average current threshold value may be, for example, 2 amps, the sixth average current threshold value may be, for example, 2.5 amps, the third cycle threshold value may be, for example, 7 amps, the seventh average current threshold value may be, for example, 2.5 amps, the eighth average current threshold value may be, for example, 3 amps, the fourth cycle threshold value may be, for example, 8 amps, and the fifth cycle threshold value may be, for example, 9 amps.

The method may further comprise: at the controller: monitoring the voltage of the battery; if the voltage of the battery is below a second battery voltage threshold for a second predetermined amount of time: determining a second energy count value representing an amount of energy delivered by the solar panel in a predetermined time period; if the second energy count value is below a second energy count value threshold: determining an average power value representing an average amount of energy delivered by the solar panel in the predetermined time period; and reducing a cycle threshold value that determines when the engine is deactivated so as to stop supplying the second charging current to the battery based on the determined average power value.

According to a second aspect, the invention provides a method for operating a temperature control system for a temperature controlled goods vehicle, wherein the temperature control system comprises: a solar panel; and a temperature control unit comprising: one or more temperature control components; a battery coupled to the solar cell for receiving a first charging current $i_1$ from the solar cell; an engine operative to supply a second charging current $i_2$ to the battery; and a controller, the method comprising: at the controller: monitoring a voltage of the battery; if the voltage of the battery is below a second battery voltage threshold for a second predetermined amount of time: determining a second energy count value representing an amount of energy delivered by the solar panel in a predetermined time period; if the second energy count value is below a second energy count value threshold: determining an average current value representing an average amount of energy delivered by the solar panel in the predetermined time period; and reducing a cycle threshold value that determines when the engine is deactivated so as to stop supplying the second charging current $i_2$ to the battery based on the average current value.

Reducing the cycle threshold value may comprise: if the average current value is greater than a first average current threshold value and the cycle threshold value is greater than a first cycle threshold value, reducing the cycle threshold value to the first cycle threshold value.

The first average current threshold value is 2 amps and the first cycle threshold value may be, for example, 5 amps.

Reducing the cycle threshold value may comprise: if the average current threshold value is greater than a second average current threshold value but less than a third average current threshold value, reducing the cycle threshold value to a second cycle threshold value; if the average current threshold value is greater than a fourth average current value but less than a fifth average current threshold value, reducing the cycle threshold value to a third cycle threshold value; if the average current threshold value is greater than a sixth average current value but less than a seventh average current threshold value, reducing the cycle threshold value to a fourth cycle threshold value.

The second average current threshold value may be, for example, 1.5 amps, the third average current threshold value may be, for example, 2 amps, the second cycle threshold value may be, for example, 4 amps, the fourth average current threshold value may be, for example, 1 amp, the fifth average current threshold value may be, for example, 1.5 amps, the third cycle threshold value may be, for example, 3 amps, the sixth average current threshold value may be, for example, 0 amps, the seventh average current threshold value may be, for example, 1 amp; and the fourth cycle threshold value may be, for example, 2 amps.

The temperature control unit may comprise a refrigeration unit, for example.

According to a third aspect, the invention provides a system for a temperature-controlled goods vehicle, the system comprising: a solar panel; a temperature control unit comprising: an engine; one or more temperature control components; a battery; a controller; and a memory, wherein the memory stores instructions which, when executed by the controller cause the controller to perform the method of the first or second aspects.

According to a fourth aspect, the invention provides a computer program comprising instructions which, when executed by a processor, cause the processor to perform the method of the first or second aspects.

According to a fourth aspect, the invention provides a temperature controlled goods vehicle comprising a system according to the third aspect.

BRIEF DESCRIPTION OF THE DRAWINGS

Embodiments of the invention will now be described, strictly by way of example only, with reference to the accompanying drawings, of which.

DETAILED DESCRIPTION

Figure 1:
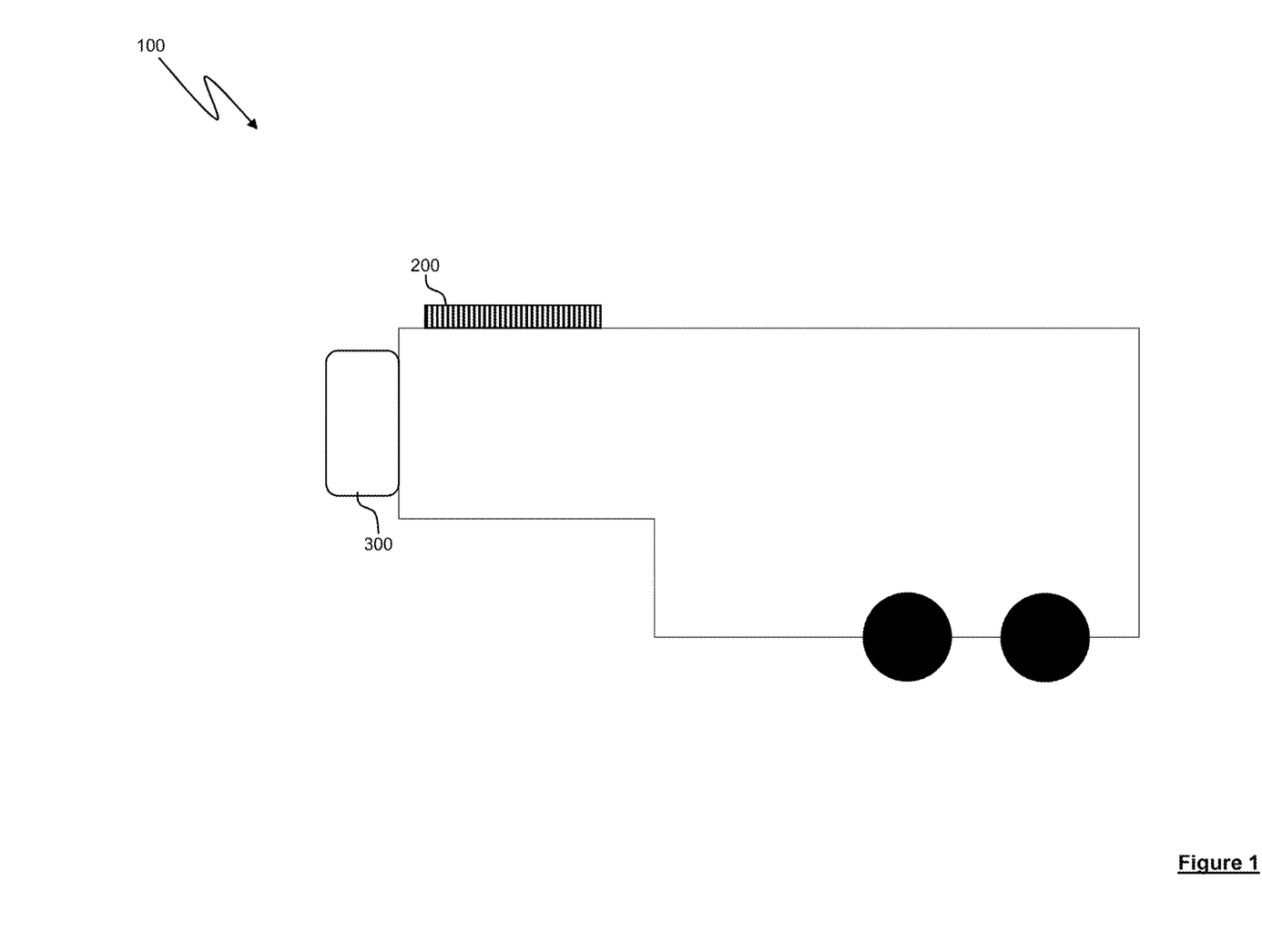
FIG. 1 is a schematic representation of a temperature controlled goods vehicle.

Referring first to FIG. 1, a temperature controlled goods vehicle is shown generally at 100. In the example illustrated in FIG. 1 the temperature controlled goods vehicle 100 is a trailer unit configured to be towed by a tractor unit, but it is to be appreciated that the present disclosure is not limited to such trailer units, but may instead be embodied in a wide variety of different temperature controlled goods vehicles including, but not limited to, vans, trucks, trains and the like.

The temperature controlled goods vehicle 100 includes a photovoltaic solar panel 200 comprising one or more photovoltaic cells and a temperature control unit 300, which may be, for example, a refrigeration system. The solar panel 200 is coupled to the temperature control unit 300 to provide a first charging current for a battery of the temperature control unit 300, as will be described in more detail below.

Figure 2:
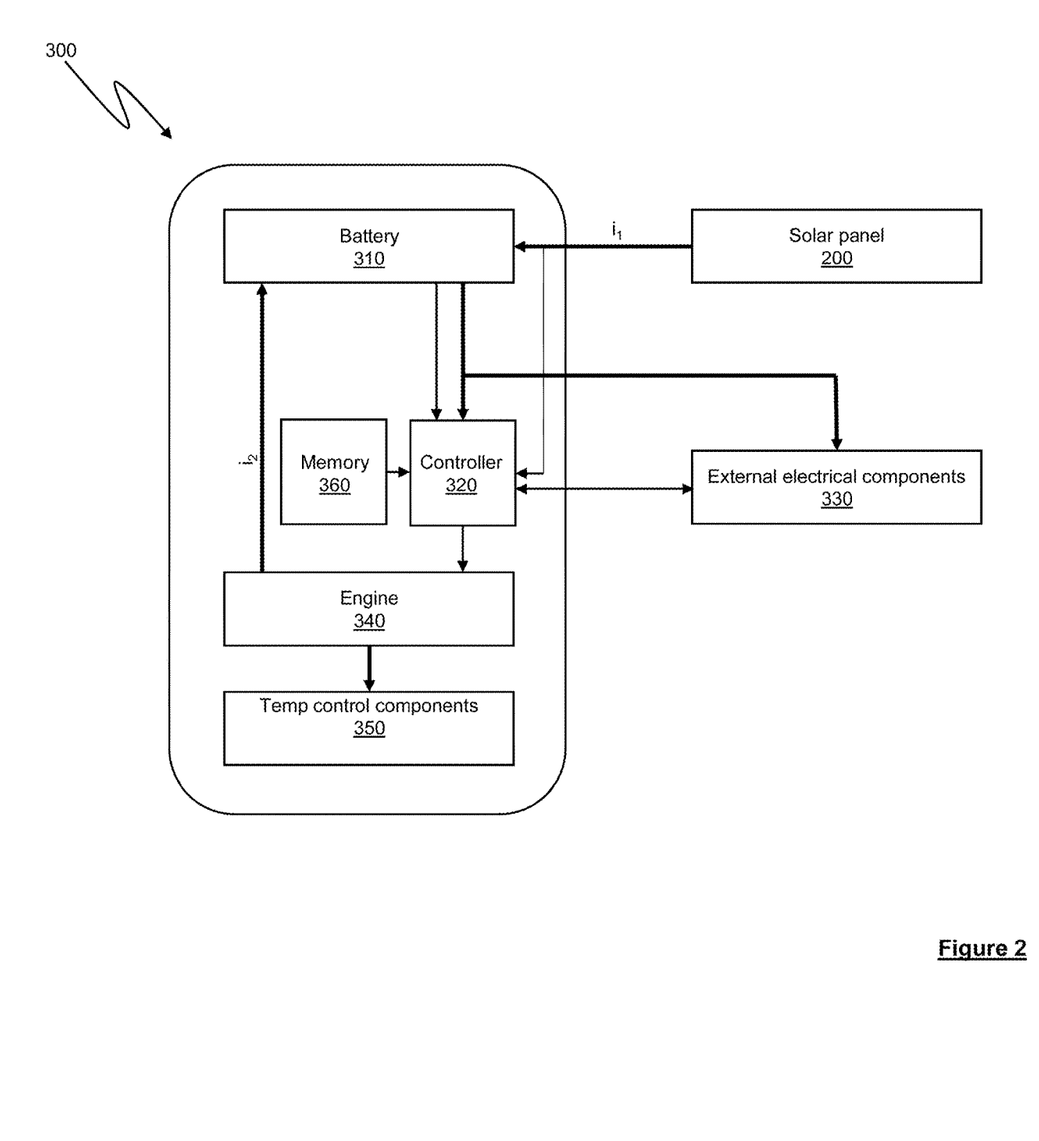
FIG. 2 is a schematic representation of a temperature control unit for the temperature controlled goods vehicle of FIG. 1.

FIG. 2 is a schematic representation of the temperature control unit 300. In one example the temperature control unit 300 may be a refrigeration system. As shown in FIG. 2, the temperature control unit includes a battery 310 which provides electrical power for electrical components such as a controller 320 of the temperature control unit 300 and electrical components 330 such as temperature sensors and actuators which may be provided externally of the temperature control unit 300 and which, in use of the temperature control unit 300, may be disposed within an interior of the temperature controlled goods vehicle 100. The temperature control unit 300, solar panel 200 and external electrical components 330 (where provided) are thus parts of a temperature control system for a temperature controlled good vehicle 100.

The temperature control unit 300 also includes an engine 340, which may be, for example, a diesel engine. The engine 340 provides motive power, where necessary, to temperature control components 350 of the temperature control unit 300 such as pumps, compressors and the like. The temperature control unit 300 may include other temperature control components that do not require motive power, such as heat exchangers, pipework and the like. Such components will not be described in detail here as they are not germane to the present disclosure.

The battery 310 is electrically coupled (directly or indirectly) to the solar panel 200 so as to receive from the solar panel 200 a first charging current $i_1$ for charging the battery 310 when sufficient solar energy is incident upon the solar panel 200.

The engine 340 includes an alternator or other electrical generator having an output that is electrically coupled to the battery 310 so as to provide a second charging current $i_2$ to the battery 310 when the engine 340 is operative.

The controller 320 may be, for example, a microprocessor, microcontroller, application specific integrated circuit (ASIC), field programmable gate array (FPGA) or the like, and is coupled to a memory 360 (e.g. a flash memory, random access memory (RAM), read-only memory (ROM), electrically erasable and programmable read only memory (EEPROM) or the like) which stores a computer program comprising instructions that are executed by the controller 320.

The controller 320 is configured to monitor signals from the external electrical components 330 such as signals indicative of the temperature within a goods space of the temperature controlled goods vehicle 100 and to control the operation of the engine 340 to maintain the temperature within the goods space at a predefined setpoint temperature, or within a predefined temperature range.

The controller 320 is also configured to monitor a voltage at the battery 310 and the first charging current $i_1$ output by the solar panel 200 to the battery 310 and to control the amount of time that the engine 340 is in operation solely to recharge the battery 310, based on these monitored parameters, as will be described in more detail with reference to FIGS. 3 and 4.

As discussed in the background section above, existing temperature control units may operable in a first mode of operation in which the engine and temperature control components operate continuously, to maintain the temperature in the goods space of the vehicle at a predetermined temperature or within a predetermined relatively narrow temperature range and in a second mode of operation in which the engine and temperature control components operate intermittently under the control of the controller, to maintain the temperature in the goods space of the vehicle within a predetermined relatively broader temperature range. In this second mode of operation the engine may be used to recharge the battery even when it is not required to maintain the temperature within the desired temperature range.

Figure 3:
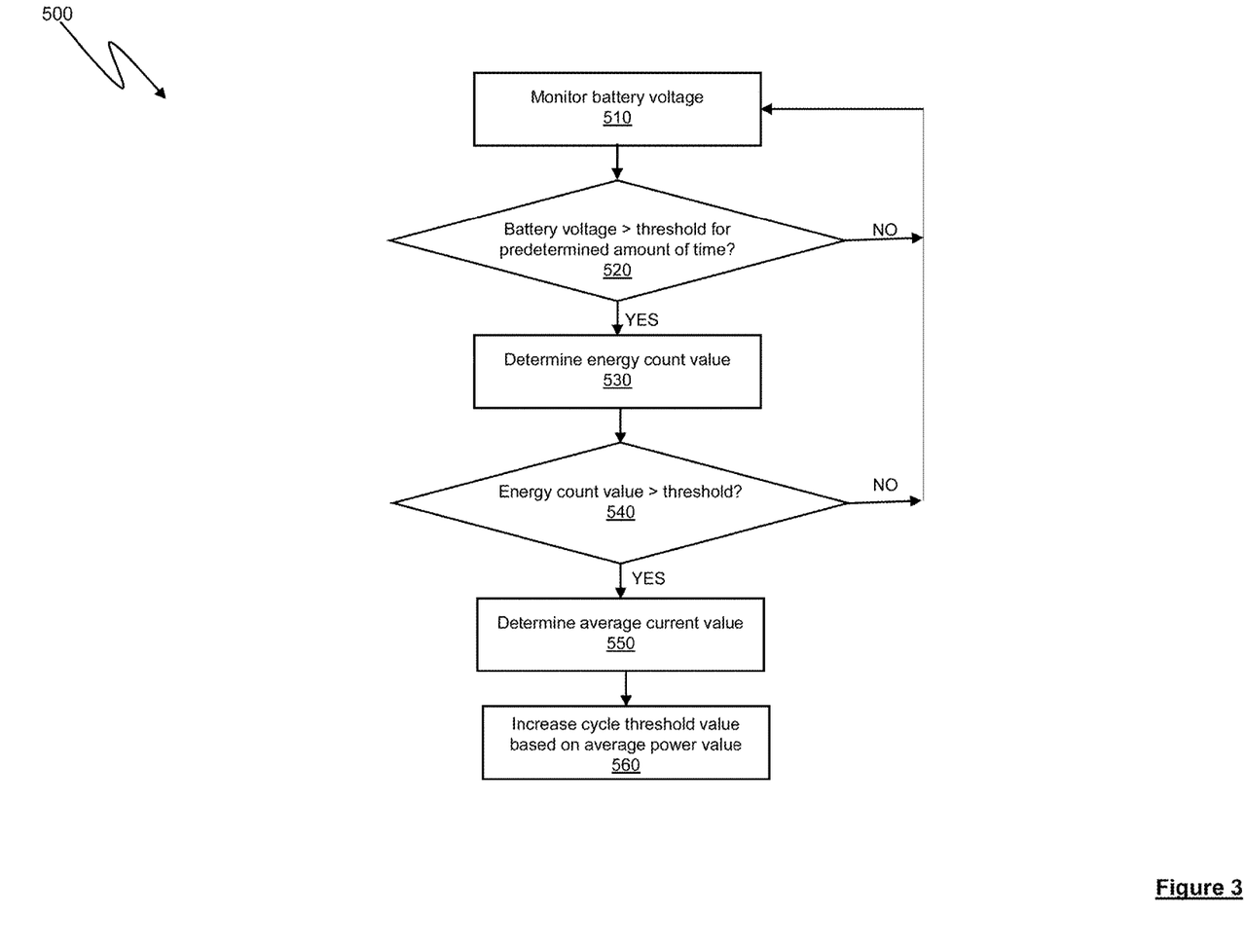
FIG. 3 is a flow diagram illustrating a method for reducing the amount of time that an engine of the temperature control unit of FIG. 2 is in operation solely to recharge a battery of the temperature control unit.

FIG. 3 is a flow diagram illustrating a method 500, performed by the controller 320 in accordance with instructions stored in the memory 360, for managing the amount of time that the engine 340 is in operation solely to recharge the battery 310, based on a dynamic cycle threshold value.

This dynamic cycle threshold value represents a threshold value to which the second charging current $i_2$ provided by the generator (e.g. alternator) of the engine 340 must fall in order to trigger the controller 320 to deactivate the engine 340 so as to stop supplying the second charging current $i_2$ to the battery 310. The cycle threshold value is dynamic in the sense that it is variable, based on the amount of energy delivered by the solar panel 200 in a predefined period of time, as will be explained in more detail below.

As the level of charge of the battery 310 increases, the amount of charging current that it can accept is reduced. Thus, the magnitude of the second charging current $i_2$ supplied by the generator (e.g. alternator) of the engine 340 of the temperature control unit 300 decreases as the level of charge of the battery 310 increases. Increasing the cycle threshold value therefore reduces the amount of time for which the engine 340 is used solely to recharge the battery 310, since a higher cycle threshold value will be reached at a lower battery charge level than a lower cycle threshold value. Varying the cycle threshold value based on the amount of energy delivered by the solar panel 200 ensures that the first charging current $i_1$ provided by the solar panel 200 can compensate for the shortfall in the charging current $i_2$ supplied by the generator of the engine 340 when the engine 340 is deactivated. Thus, the method 500 can be used to reduce the amount of time for which the engine 340 is used solely to charge the battery 310, thus reducing the fuel consumption of the temperature control unit 300.

In operation of the temperature control unit 300 in accordance with the method 500, the dynamic cycle value threshold is initially set to a default value which may be, for example, less than 5 amps.

The controller 320 continuously monitors the voltage at the battery 310 (step 510) and determines if the battery voltage has exceeded a predefined first battery voltage threshold (e.g. approximately 12.6 volts) for a predetermined amount of time (e.g. 2 hours). A positive determination is indicative that the solar panel 200 has been able to supply sufficient first charging current $i_1$ to maintain the battery 310 at a state of charge that is capable of sustaining normal operation of the temperature control unit 300 without requiring additional charging current from the engine 340.

If the controller 320 determines, at step 520, that the battery voltage has indeed exceeded the first predefined battery voltage threshold for the predetermined amount of time, it proceeds to step 530, at which the controller 320 determines a first energy count value. The energy count value is a metric indicative of the amount of energy delivered by the solar panel 200 in a predetermined period of time, and may be determined, for example, by integrating the value of the first charging current $i_1$ over the predetermined period of time.

At step 540 the controller 320 compares the energy count value to an energy count value threshold (e.g. 2 Ah) to determine whether the total amount of energy delivered by the solar panel 200 exceeds a minimum amount of energy required to maintain the battery 310 at a state of charge that is capable of sustaining normal operation of the temperature control unit 300 without requiring additional charging current from the engine 340.

If the energy count value exceeds the energy count threshold the controller 320 proceeds to step 550, at which the controller 320 determines an average current value indicative of the average current per unit time delivered by the solar panel 200 over the predetermined amount of time.

The controller 320 then (at step 550) increases the cycle threshold value based on the determined average current value. For example, if the average current value is greater than 1 amp but less than 1.5 amps and the current cycle threshold value is less than 5 amps, the controller 320 may increase the cycle threshold value to 5 amps. If the average current value is greater than 1.5 amps but less than 2 amps, the controller 320 may increase the cycle threshold value to 6 amps. If the average current value is greater than 2 amps but less than 2.5 amps, the controller 320 may increase the cycle threshold value to 7 amps. If the average current value is greater than 2.5 amps but less than 3 amps, the controller 320 may increase the cycle threshold value to 8 amps. If the average current value is greater than 3 amps, the controller 320 may increase the cycle threshold value to 9 amps.

Thus, the cycle threshold value is adjusted based on the amount of first charging current $i_1$ supplied by the solar panel 200. The more first charging current $i_1$ that is supplied by the solar panel 200, the greater the increase in the cycle threshold value, and thus the less time the engine 340 is operational solely to charge the battery 310.

In conditions such as heavy cloud cover or darkness the first charging current $i_1$ provided by the solar panel 200 may not be, or may no longer be, sufficient to compensate for the shortfall in the second charging current $i_2$ supplied by the generator of the engine 340 when the engine 340 is deactivated. When such conditions are detected or anticipated the cycle threshold value can be reduced, such that the engine 340 will be deactivated at a later point, when the second charging current $i_2$ is lower, because the charge level of the battery 310 will need to be higher before the reduced amount of first charging current $i_1$ provided by the solar panel 200 will be sufficient to compensate for the shortfall in charging current $i_2$ supplied by the generator of the engine 340 when the engine 340 is deactivated.

Figure 4:
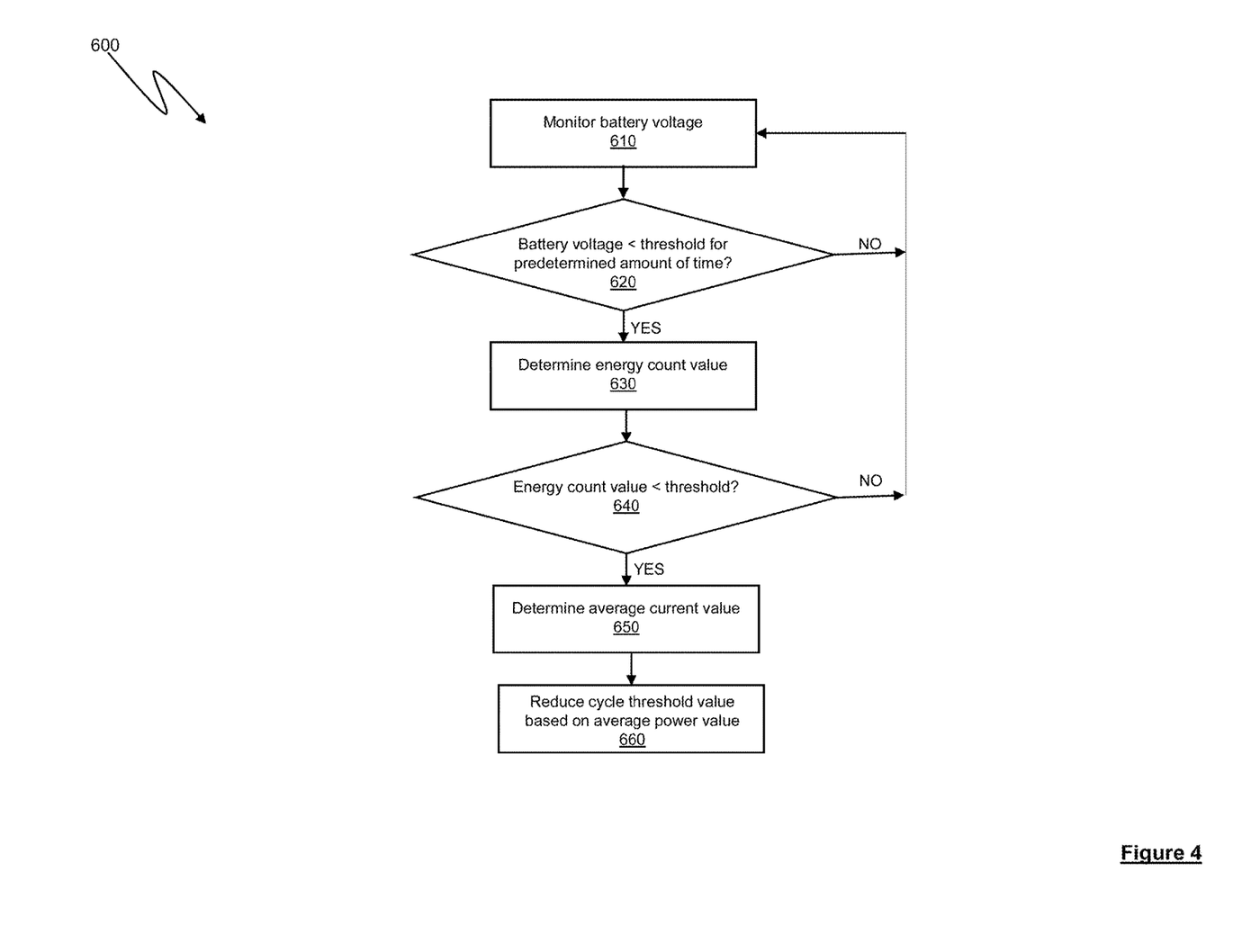
FIG. 4 is a flow diagram illustrating a method for increasing the amount of time that an engine of the temperature control unit of FIG. 2 is in operation solely to recharge a battery of the temperature control unit.

FIG. 4 is a flow diagram illustrating steps in method 600, performed by the controller 320 in accordance with the instructions stored in the memory 360, for increasing the amount of time that the engine 340 is in operation solely to recharge the battery 310, by reducing the dynamic cycle threshold value. The steps of the method 600 illustrated in FIG. 4 may be performed subsequently to the steps of the method 500 illustrated in FIG. 3 (e.g. the method 600 may be an extension of the method 500), for example if conditions change after the dynamic cycle threshold value has been increased in accordance with the method 500, or may be performed separately or in isolation from the steps of the method 500.

In operation of the temperature control unit 300 in accordance with the method 600, the dynamic cycle value threshold is initially set to a value which may be, for example, a default value or may be a value determined in accordance with the method 500 described above and illustrated in FIG. 5. The initial value of the dynamic cycle value threshold may be, for example, greater than 5 amps.

The controller 320 continuously monitors the voltage at the battery 310 (step 610) and determines, at step 620, if the battery voltage has been below a predefined battery voltage threshold (e.g. 12.6 volts) for a predetermined amount of time (e.g. 2 hours). A positive determination is indicative that the solar panel has not been able to supply sufficient first charging current $i_1$ to maintain the battery 310 at a state of charge that is capable of sustaining normal operation of the temperature control unit 300 without requiring additional charging current from the engine 340.

If the controller 320 determines that the battery voltage has been below the predefined battery voltage threshold for the predetermined amount of time, it proceeds to step 630, at which the controller 320 determines an energy count value. As in the method 500, the energy count value is a metric indicative of the amount of energy delivered by the solar panel 200 in a predetermined period of time, and may be determined, for example, by integrating the value of the first charging current $i_1$ over the predetermined period of time.

At step 640 the controller 320 compares the energy count value to an energy count value threshold (e.g. 2 Ah) to determine whether the total amount of energy delivered by the solar panel 200 is less than a minimum amount of energy required to maintain the battery 310 at a state of charge that is capable of sustaining normal operation of the temperature control unit 300 without requiring additional charging current from the engine 340.

If the energy count value is less than the energy count threshold the controller 320 proceeds to step 650, at which the controller 320 determines an average current value indicative of the average current per unit time delivered by the solar panel 200 over the predetermined amount of time.

The controller 320 then (at step 660) reduces the cycle threshold value based on the average current value. For example, if the average current value is greater than 2 amps and the current cycle threshold value is greater than 5 amps, the controller 320 may reduce the cycle threshold value to 5 amps. If the average current value is greater than 1.5 amps but less than 2 amps, the controller 320 may reduce the cycle threshold value to 4 amps. If the average current value is greater than 1 amp but less than 1.5 amps, the controller 320 may reduce the cycle threshold value to 3 amps. If the average current value is greater than 0 amps but less than 1 amp, the controller 320 may reduce the cycle threshold value to 2 amps.

Thus, the cycle threshold value is adjusted based on the amount of charging current $i_1$ supplied by the solar panel 200. The less charging current $i_1$ that is supplied by the solar panel 200, the greater the reduction in the cycle threshold value, and thus the more time the engine 340 is operational solely to charge the battery 310.

As will be apparent from the discussion above, the temperature control unit 300 and the methods 500, 600 described above permit the amount of time for which the engine 340 is operational to be adjusted according to the ability of the solar panel 200 to supply charging current to the battery 310. Thus, the fuel consumption of the temperature control unit 300 can be reduced in conditions in which the solar panel 200 is able to meet the charging current required to maintain the battery 310 in a state of charge that is capable of sustaining normal operation of the temperature control unit 300 without compromising the operation of the temperature control unit 300 in conditions in which the solar panel 200 is not able to meet these charging current requirements.

The memory 360 will typically be programmed at the time of manufacture of the temperature control unit 300 with a computer program comprising instructions to cause the processor 320 to perform the methods 500, 600 described above with reference to FIGS. 3 and 4. Additionally, existing temperature control units can be upgraded to enable them to perform the methods described above by downloading a computer program comprising appropriate instructions which, when executed by a processor of such an existing temperature control unit, causes the processor to perform the methods 500, 600.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in

The invention claimed is:

1. A method for operating a temperature control system for a temperature controlled goods vehicle, wherein the temperature control system comprises:
a solar panel and
a temperature control unit comprising:
one or more temperature control components;
a battery coupled to the solar cell for receiving a first charging current $i_1$ from the solar cell;
an engine operative to supply a second charging current $i_2$ to the battery; and
a controller,
the method comprising:
at the controller:
monitoring a voltage of the battery;
determining that the voltage of the battery exceeds a first battery voltage threshold for a first predetermined amount of time;
responsive to the determination that the voltage of the battery exceeds a first battery voltage threshold for a first predetermined amount of time:
determining a first energy count value representing an amount of energy delivered by the solar panel in a predetermined time period;
upon determining that the first energy count value exceeds a first energy count value threshold:
determining an average current value representing an average amount of energy delivered by the solar panel in the predetermined time period; and
increasing a cycle threshold value that determines when the engine is deactivated so as to stop supplying the second charging current $i_2$ to the battery based on the average current value.

2. A method according to claim 1 wherein increasing the cycle threshold value comprises:
upon determining that the average current value is greater than a first average current threshold value but less than a second average current threshold value and the cycle threshold value is less than a first cycle threshold value, increasing the cycle threshold value to the first cycle threshold value.

3. A method according to claim 2 wherein:
the first average current threshold value is 1 amp;
the second average current threshold value is 1.5 amps; and
the first cycle threshold value is 5 amps.

4. A method according to claim 1 wherein increasing the cycle threshold value comprises:
upon determining that the average current value is greater than a third average current threshold value but less than a fourth average current threshold value, increasing the cycle threshold value to a second cycle threshold value;
upon determining that the average current value is greater than a fifth average current threshold value but less than a sixth average current threshold value, increasing the cycle threshold value to a third cycle threshold value;
upon determining that the average current value is greater than a seventh average current threshold value but less than an eighth average current threshold value, increasing the cycle threshold value to a fourth cycle threshold value; and
upon determining that the average current value is greater than a ninth average current threshold value, increasing the cycle threshold value to a fifth cycle threshold value.

5. A method according to claim 4 wherein:
the third average current threshold value is 1.5 amps;
the fourth average current threshold value is 2 amps;
the second cycle threshold value is 6 amps;
the fifth average current threshold value is 2 amps;
the sixth average current threshold value is 2.5 amps;
the third cycle threshold value is 7 amps;
the seventh average current threshold value is 2.5 amps;
the eighth average current threshold value is 3 amps;
the fourth cycle threshold value is 8 amps; and
the fifth cycle threshold value is 9 amps.

6. A method according to claim 1, the method further comprising:
at the controller:
monitoring the voltage of the battery;
upon determining that the voltage of the battery is below a second battery voltage threshold for a second predetermined amount of time:
determining a second energy count value representing an amount of energy delivered by the solar panel in a predetermined time period;
upon determining that the second energy count value is below a second energy count value threshold:
determining an average power value representing an average amount of energy delivered by the solar panel in the predetermined time period; and
reducing a cycle threshold value that determines when the engine is deactivated so as to stop supplying the second charging current to the battery based on the determined average power value.

7. A non-transitory computer-readable medium storing instructions which, when executed by a processor, cause the processor to perform the method of claim 1.

8. A method for operating a temperature control system for a temperature controlled goods vehicle, wherein the temperature control system comprises:
a solar panel; and
a temperature control unit comprising:
one or more temperature control components;
a battery coupled to the solar cell for receiving a first charging current $i_1$ from the solar cell;
an engine operative to supply a second charging current $i_2$ to the battery; and
a controller,
the method comprising:
at the controller:
monitoring a voltage of the battery;
determining that the voltage of the battery is below a second battery voltage threshold for a second predetermined amount of time;
responsive to the determination that the voltage of the battery is below a second battery voltage threshold for a second predetermined amount of time:
determining a second energy count value representing an amount of energy delivered by the solar panel in a predetermined time period;
upon determining that the second energy count value is below a second energy count value threshold:
determining an average current value representing an average amount of energy delivered by the solar panel in the predetermined time period; and
reducing a cycle threshold value that determines when the engine is deactivated so as to stop supplying the second charging current $i_2$ to the battery based on the average current value.

9. A method according to claim 8 wherein reducing the cycle threshold value comprises:
upon determining that the average current value is greater than a first average current threshold value and the cycle threshold value is greater than a first cycle threshold value, reducing the cycle threshold value to the first cycle threshold value.

10. A method according to claim 9 wherein the first average current threshold value is 2 amps and the first cycle threshold value is 5 amps.

11. A method according to claim 9 wherein reducing the cycle threshold value comprises:
upon determining that the average current threshold value is greater than a second average current value but less than a third average current threshold value, reducing the cycle threshold value to a second cycle threshold value;
upon determining that the average current threshold value is greater than a fourth average current value but less than a fifth average current threshold value, reducing the cycle threshold value to a third cycle threshold value;
upon determining that the average current threshold value is greater than a sixth average current value but less than a seventh average current threshold value, reducing the cycle threshold value to a fourth cycle threshold value.

12. A method according to claim 11 wherein:
the second average current threshold value is 1.5 amps;
the third average current threshold value is 2 amps;
the second cycle threshold value is 4 amps;
the fourth average current threshold value is 1 amp;
the fifth average current threshold value is 1.5 amps;
the third cycle threshold value is 3 amps;
the sixth average current threshold value is 0 amps;
the seventh average current threshold value is 1 amp; and
the fourth cycle threshold value is 2 amps.

13. A non-transitory computer-readable medium storing instructions which, when executed by a processor, cause the processor to perform the method of claim 8.

14. A system for a temperature-controlled goods vehicle, the system comprising:
a solar panel;
a temperature control unit comprising:
one or more temperature control components;
a battery coupled to the solar panel for receiving a first charging current $i_1$ from the solar panel;
an engine operative to supply a second charging current $i_2$ to the battery;
a controller; and
a memory,
wherein the memory stores instructions which, when executed by the controller, cause the controller to:
monitor a voltage of the battery;
if the voltage of the battery exceeds a first battery voltage threshold for a first predetermined amount of time:
determine a first energy count value representing an amount of energy delivered by the solar panel in a predetermined time period;
if the first energy count value exceeds a first energy count value threshold:
determine an average current value representing an average amount of energy delivered by the solar panel in the predetermined time period; and
increase a cycle threshold value that determines when the engine is deactivated so as to stop supplying the second charging current $i_2$ to the battery based on the average current value.

15. A temperature controlled goods vehicle comprising a system according to claim 14.

16. A system for a temperature-controlled goods vehicle, the system comprising:
a solar panel;
a temperature control unit comprising:
one or more temperature control components;
a battery coupled to the solar panel for receiving a first charging current $i_1$ from the solar panel;
an engine operative to supply a second charging current $i_2$ to the battery;
a controller; and
a memory,
wherein the memory stores instructions which, when executed by the controller, cause the controller to:
monitor a voltage of the battery;
if the voltage of the battery is below a second battery voltage threshold for a second predetermined amount of time:
determine a second energy count value representing an amount of energy delivered by the solar panel in a predetermined time period;
if the second energy count value is below a second energy count value threshold:
determine an average current value representing an average amount of energy delivered by the solar panel in the predetermined time period; and
reduce a cycle threshold value that determines when the engine is deactivated so as to stop supplying the second charging current $i_2$ to the battery based on the average current value.

17. A temperature controlled goods vehicle comprising a system according to claim 16.

* * * * *